(12) United States Patent
Behbehani

(10) Patent No.: US 7,965,192 B2
(45) Date of Patent: Jun. 21, 2011

(54) PHOTO SENSITIVE DEVICE

(76) Inventor: Fawzi Qasem Behbehani, Abdula Mubark (KW)

( * ) Notice: Subject to any disclaimer, the term of this patent is extended or adjusted under 35 U.S.C. 154(b) by 604 days.

(21) Appl. No.: 11/843,886

(22) Filed: Aug. 23, 2007

(65) Prior Publication Data

US 2009/0051553 A1    Feb. 26, 2009

(51) Int. Cl.
*G08B 17/12* (2006.01)
*G08B 23/00* (2006.01)
*G05B 5/00* (2006.01)
*B65D 55/02* (2006.01)
*E05F 15/20* (2006.01)

(52) U.S. Cl. ........ 340/600; 340/500; 318/480; 215/214; 160/5

(58) Field of Classification Search ............ 340/600, 340/500, 506; 318/286, 468, 480; 250/214 AL; 160/5; 49/25; 315/150
See application file for complete search history.

(56) References Cited

U.S. PATENT DOCUMENTS

| | | | | |
|---|---|---|---|---|
| 5,646,591 A * | 7/1997 | Issa et al. | | 340/566 |
| 6,084,231 A * | 7/2000 | Popat | | 250/214 AL |
| 7,111,952 B2 * | 9/2006 | Veskovic | | 362/1 |
| 7,417,397 B2 * | 8/2008 | Berman et al. | | 318/468 |
| 2003/0030548 A1 * | 2/2003 | Kovacs et al. | | 340/426 |

* cited by examiner

*Primary Examiner* — Daniel Wu
*Assistant Examiner* — Mark Rushing
(74) *Attorney, Agent, or Firm* — Lowe Hauptman Ham & Berner, LLP

(57) ABSTRACT

A photosensitive device for warning an individual that the interior light level on one side of the window is greater than the light level on the outside of the window includes first and second photo sensors, a comparator circuit and/or a logic circuit and an alarm. The device may also include a timer, an amplifier and rheostat as well as a visual indicator that remains in a on condition after an audible sound is turned off. A reset circuit is used to turn off the visual indicator. A method for accomplishing the same is also described.

2 Claims, 4 Drawing Sheets

US 7,965,192 B2

PHOTO SENSITIVE DEVICE

FIELD OF THE INVENTION

This invention relates to a photo sensitive device and more particularly to a photosensitive device for warning an individual that the interior light level on one side of a window is greater than the exterior light level on an opposite side of the window.

BACKGROUND FOR THE INVENTION

Light activated curtain pullers, automatic blind controllers and architectural opening covers having automatic positioning capability are known. For example, a U.S patent of Bernot, U.S. Pat. No. 4,864,201 discloses an automatic electro-mechanical device for opening and closing a curtain in response to light striking a photoelectric cell. The device includes a miniature high torque reversible electric motor and control package to close the drapes at sundown and open the drapes at sunup. The device comprises a dual timer circuit with individual ramping circuits. One timer circuit monitors the sustained presence or absence of light. The other timer regulates the motor drive run time. A flip flop circuit signals the current state of the curtains by providing memory of the last directional movement of the motor.

A more recent approach to automatic blind controllers is disclosed in the U.S. patent of Element et al., U.S. Pat. No. 5,532,560. As shown therein, device a controller includes a reversible motor, a drive circuit, a photosensitive sensor, a user input, a central signal processor, a command circuit and a feed back sensor. The reversible motor is operably connected to the opening and closing device. The drive circuit is connected to the motor for generating a drive signal. The photosensitive sensor generates a sensor signal and the input sensor generates an input signal. The control signal processor is operatively connected to the photosensitive sensor and the user input for combining the signals to produce a control signal.

A further approach to an automatic positioning system for covering an architectural opening is disclosed in an U.S. Patent Application Publication, No. 2003/0098133 of Palmer. The Palmer reference discloses a system that is configured to automatically adjust the position of the covering between a closed position, an open position and one or more intermediate positions in accordance with a geographic location associated with an architectural opening and the time of day.

Notwithstanding the above, it is presently believed that there may be a significant demand for a photosensitive device for warning an individual that the interior light level on one side of a window is greater than the exterior light level on the outside of the window. There should be a demand for devices in accordance with the present invention because such devices provide a warning when it is time to close the curtains based on an actual lighting condition as opposed to an artificially selected time of day. Further, the devices in accordance with the present invention automatically compensate for changes in weather related conditions as for example heavy cloud cover verses bright sun. In addition, the devices in accordance with the present invention also compensate for the amount of artificial lighting in a room and allow an individual to continue to enjoy a view of the exterior by adjusting or turning off the interior lights while maintaining their privacy.

In addition to the above, the devices in accordance with the present invention can be manufactured and sold at a competitive price, are durable and are relatively easy to install. Further, one embodiment of the invention provides an alarm of limited duration and a continued visual indicator until such time the curtains are closed.

BRIEF SUMMARY OF THE INVENTION

In essence the present invention contemplates a photosensitive device for warning an individual that the interior light level on one side of a window is greater than the exterior light level on the opposite side of the window. The device includes a first photo sensor that is constructed and arranged for sensing or determining the interior light level on a first side of the window. The device also includes a second photo sensor constructed and arranged to sense or determine the exterior light level on the opposite side of the window. Each of the photo sensors provides an electrical signal which is indicative of the light levels on one side of the window. The signals are fed to a comparator circuit which compares the two light levels and feeds a signal to an alarm for actuating the alarm when the light level of the interior exceeds the light level on the exterior of the window. The alarm warns the individual that it is time to close the drapes or turn off the lights in the interior of the window i.e. the interior of a room.

In a preferred embodiment of the invention a timer turns off the alarm after a predetermined time as for example after one minute. However, in this embodiment of the invention, the device includes a second alarm i.e. a visual indicator such as an LED (light emitting diode) that remains in its activated state until manually turned off or reset.

The invention will now be described in connection with the accompanying drawings wherein like reference numerals have been used to identify like parts.

DESCRIPTION OF THE DRAWINGS

The invention will now be described in connection with the accompanying drawings wherein like reference numerals have been used to indicate like parts.

DESCRIPTION OF THE PREFERRED EMBODIMENTS OF THE INVENTION

Figure 1:
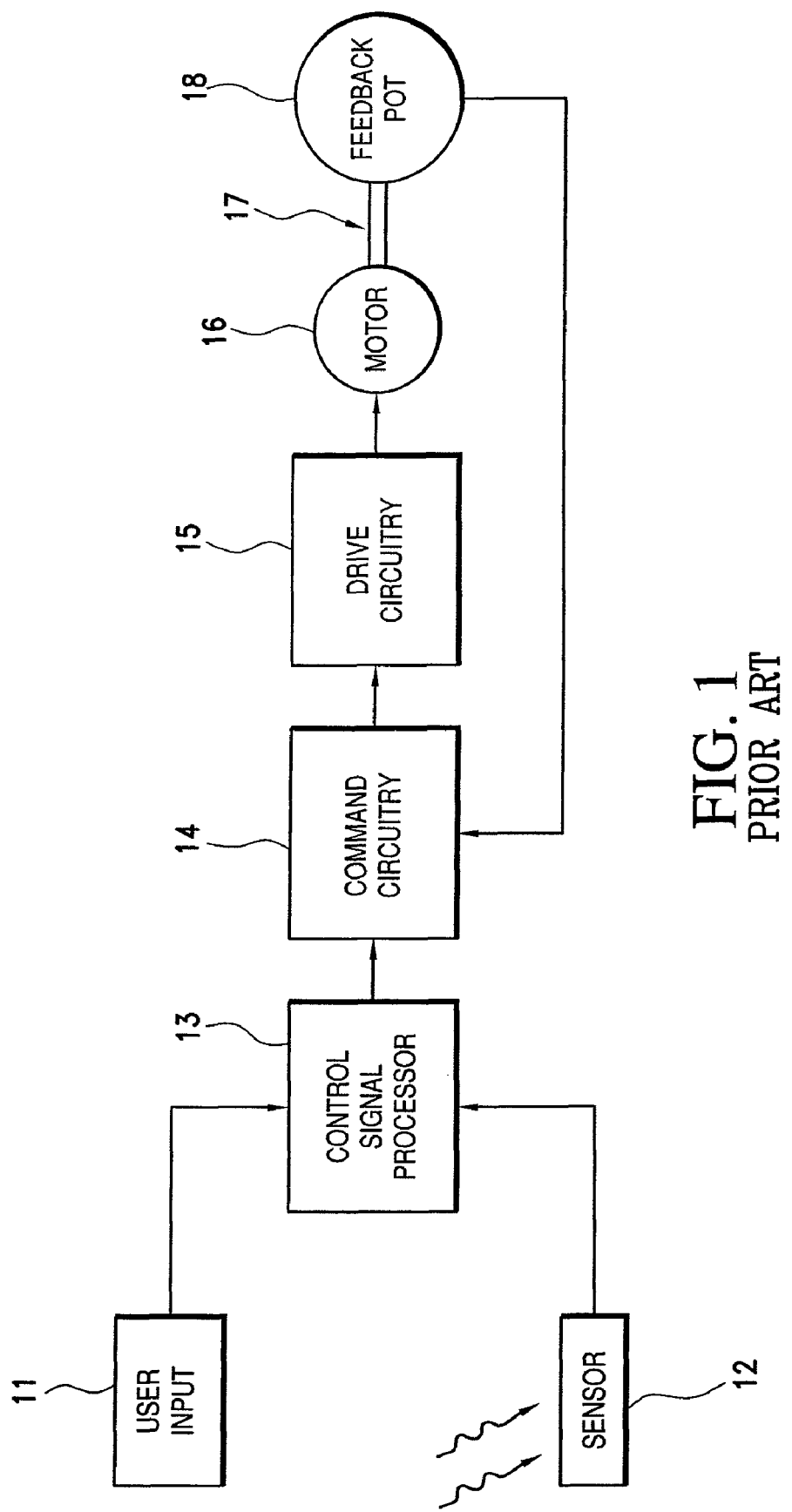
FIG. 1 is a block diagram of the circuitry for a prior art photosensitive automatic blind controller.

FIG. 1 is a block diagram of the circuitry for a prior art photosensitive device. As shown, the circuitry 10 includes a user input 11, a sensor 12, control signal processor 13, command circuitry 14, drive circuitry 15, reversible motor 16, a drive shaft 17 and feed back potentiometer 18.

The control signal processor 13 produces a control signal which is the weighted sum of the signal from the sensor 12 and a signal from the user input 11. The signals from the user input 11 are weighted to determine their relative influence over the output of the control processor 13. Typically, the weighting factor for the user in put is sufficiently high so that the user can override the effect of sensor 12. The weighting factor for sensor 12 determines the band width for the weighted signal which determines the degree of change in the intensity of the sum necessary to affect the control signal which in turn causes the blinds (not shown) to change position.

Further details of the prior art are shown in the U.S. Pat. No. 5,532,560 which is incorporated herein in its entirety by reference.

Figure 2:
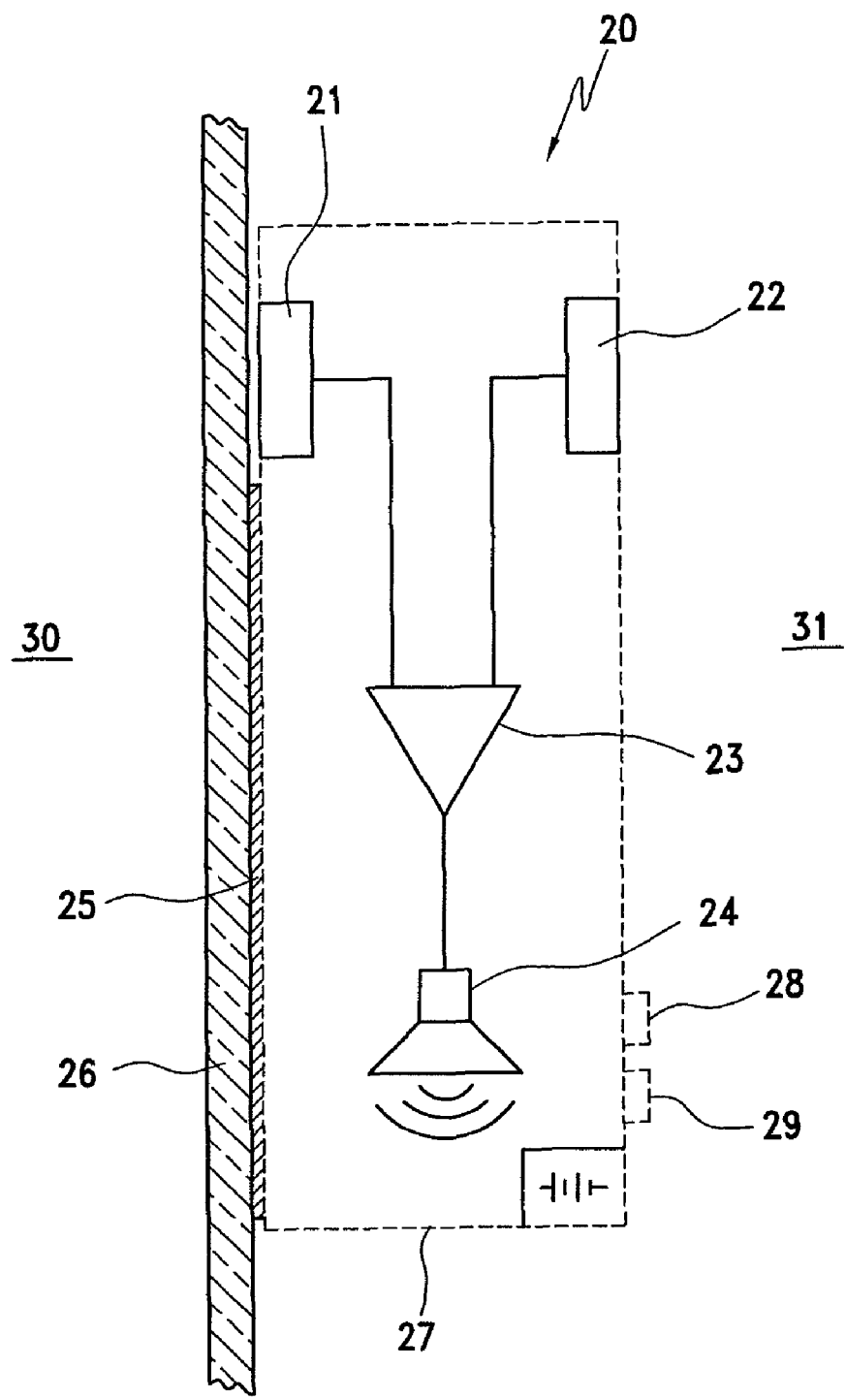
FIG. 2 is a schematic illustration of a photosensitive device in accordance with a first embodiment of the invention.

A photosensitive device 20 in accordance with a first embodiment of the invention will now be described in connection with FIG. 2. The photo sensor device 20 warns an individual (an occupant of a room) that the light level on one side of a window 26 (the interior of the room) is greater than the light level on the outside of the window 26. In essence, the photosensitive device 20 warns the inhabitants of a building such as a house that individuals on the outside of the house can see the interior of the room and that it is time to close their drapes or turn off the interior lights if they want to maintain their privacy.

The device 20 includes a first light sensor 21 that senses the light level on the exterior 30 of the window 26 and a second light sensor 22 for sensing the light level on the interior 31 of the room i.e. on the inside of the widow 26. Each of the light sensors 21 and 22 feed an electrical signal to a comparator circuit 23 that sends a signal to an alarm 2. The photo sensors 21 and 22 are conventional in design and available from a number of manufacturers and/or distributors. For example the silicon photodiodes, barrier layer devices etc. The comparator circuit 23 is also of a conventional design which will be well understood by persons of ordinary skill in the art.

The comparator circuit 23 is connected to and sends an electrical signal to an alarm 24 to indicate that the light level on the inside of the window is greater than the light level on the outside which indicates that individuals on the outside can see into the interior of the room. In the first embodiment of the invention, the device 20 includes a suitable housing 27 such as a small transparent box and a fastener 25 such as two hook and loop (Velcrot™) fasteners wherein one of the hook and loop fasteners is fixed to the window by an adhesive and the other of the hook and loop fasteners is adhesively held to the housing 27. As shown schematically, the photosensitive device 20 also includes means 28 such as a rheostat for increasing the sound level of the alarm and a timer 29 for setting the length of time the alarm will sound before automatically stopping. The numbers 30 and 31 have been used to indicate the outside and inside of a window 26 respectively.

Figure 3:
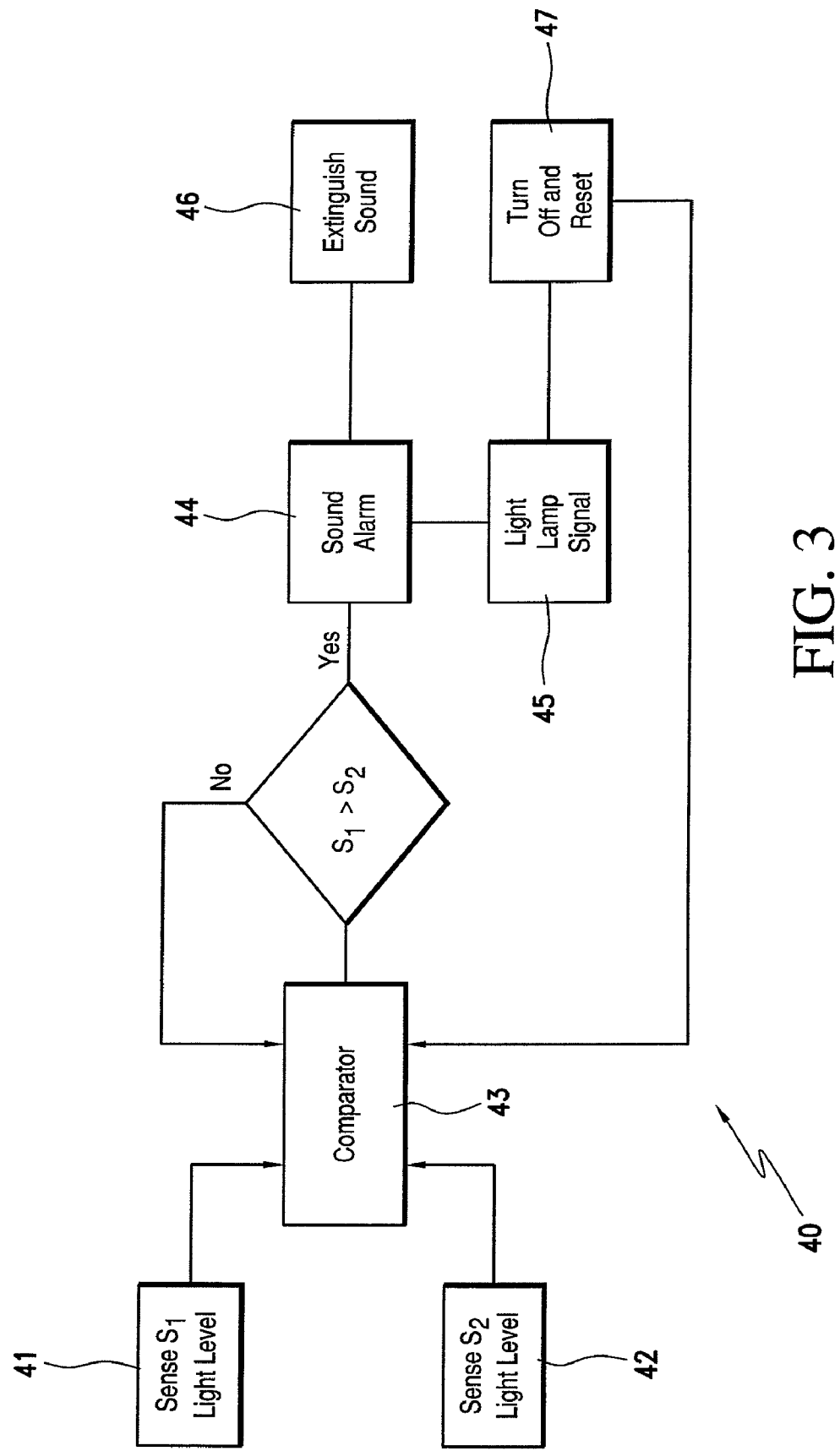
FIG. 3 is a block diagram of a photosensitive device in accordance with a second embodiment of the invention.

FIG. 3 illustrates a photosensitive device 40 in accordance with a second embodiment of the invention. The photosensitive device 40 warns an individual or individuals that the light level on the outside of a room is lower than the light level on the inside and therefore allows individuals on the outside to see into the inside of the room. The photosensitive device 40 includes a first light sensor 41 that senses the light level on the exterior of a window (not shown). A second light sensor 42 senses the light level on the interior of the window. Each of the light sensors 41 and 42 feed an electrical signal to a comparator circuit 43. The comparator circuit then sends a signal to a filter 43 or other suitable means such as a logic circuit to an alarm when the light level on the interior of a room is greater than the light level on the exterior i.e. on the other side of the window. To be more specific, if the signal indicates that the light level of the inside of the room is less than the light level on the outside of the room, no signal is sent to the alarm, but the device is recycled to continue to measure the two light levels until such time as the signal on the interior of the room exceeds that on the exterior. When the interior light level is greater than the exterior light level a signal is sent to the alarm 44 and sounds the alarm and at the same time actuates a visual indicator 45 such as an LED. In this embodiment of the invention, a timer 46 deactivates the audible alarm after a pre-determined time as for example 30 seconds, 1 minute etc. However, the visual indicator 45 remains lit until an individual activates a reset button 47.

Figure 4:
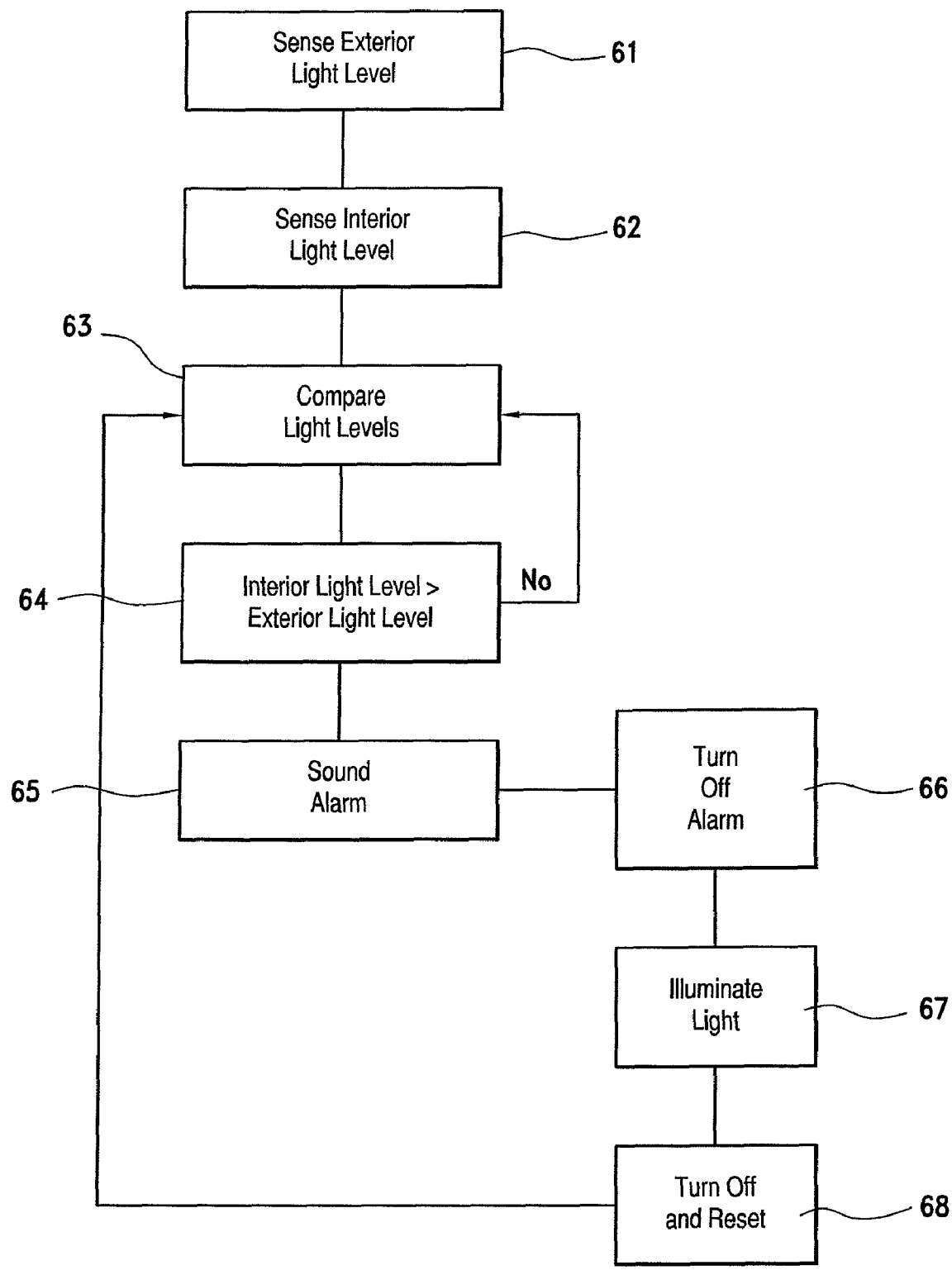
FIG. 4 is a block diagram illustrating a method for warning an individual that the interior light level in a room is greater than the exterior light level on the opposite of a window.

The invention also contemplates a method for warning an individual that the interior light level on one side of the window is greater than the exterior light level on an opposite side of the window. The method as illustrated in FIG. 4 includes the steps of providing a first photosensor and using the first photo sensor to determine the level of light on the exterior of a window in step 61 and providing a second photosensor and using the second photosensor to sense the light level on the interior of the window in step 62. The method also includes the steps of providing a comparator circuit, a logics circuit or logic means for comparing the light level on the exterior and interior of a room in step 63 and a logic circuit for sending a signal to an alarm in step 64 when the interior light level is greater than the exterior light level. However, if the exterior light level is greater than the interior light level the system is automatically recycled. In step 65 an alarm is sounded so that individuals in a room will realize that individuals on the outside can see into the room. In a preferred embodiment of the invention, a timer turns off the audio alarm in step 66 after a predetermined time and illuminates a visual indicator in step 67. Therefore, an individual who was absent from the room will recognize that it is time to close the blinds. The use of the audio and visual alarm gives an individual a choice of whether or not to close a blind or to leave the blinds open if there is no concern for privacy. It also provides a simple and less expensive approach than an automatic curtain closer. However, in the preferred form of the invention, the method includes the step 68 of turning off the visual indicator and resetting the device.

While the invention has been described in connection with its preferred embodiments it should be recognized that changes and modifications may be made therein without departing from the scope of the appended claims.

What is claimed is:

1. A method for maintaining privacy in the interior of a room by warning an individual that the light level in the interior of a room is greater than the light level on the outside of a window and allowing the adjustment thereof, comprising the steps of:

providing a transparent housing;

securing said transparent housing on an interior side of said window;

providing a first photosensor, a second photosensor, and a comparator means operably within said transparent housing;

sensing and measuring the light level on the interior of the room using said first photosensor;

sensing and measuring the light level on the exterior of the room outside said window using said second photosensor;

comparing the measured light levels on the interior and the exterior of the room using said comparator means;

providing an audible alarm and a visual indicator within said transparent housing;

sounding said audible alarm when the measured light level on the interior of the room is greater than the measured light level on the exterior of the room;

turning off said audible alarm automatically after a pre-selected time;

illuminating said visual indicator when the measured light level on the interior of the room is greater than the measured light level on the exterior of the room and maintaining the visual indicator illuminated; and, manually turning off the visual indicator by the individual and recycling the steps.

2. The method for maintaining privacy in the interior of a room by warning an individual that the light level in the interior of a room is greater than the light level on the outside of a window and allowing the adjustment thereof according to claim 1, further comprising the step of compensating for the transparency of the window using a compensating means.

* * * * *